(12) United States Patent
Langer

(10) Patent No.: US 7,827,878 B2
(45) Date of Patent: Nov. 9, 2010

(54) BEVEL GEAR MECHANISM, ESPECIALLY BEVEL SPUR-GEAR MECHANISM

(75) Inventor: Peter Langer, Penig (DE)

(73) Assignee: Flender Industriegetriebe GmbH, Penig (DE)

( * ) Notice: Subject to any disclaimer, the term of this patent is extended or adjusted under 35 U.S.C. 154(b) by 323 days.

(21) Appl. No.: 12/034,613

(22) Filed: Feb. 20, 2008

(65) Prior Publication Data

US 2008/0196527 A1 Aug. 21, 2008

(30) Foreign Application Priority Data

Feb. 20, 2007 (DE) .................. 10 2007 008 658

(51) Int. Cl.
 *F16H 1/14* (2006.01)
(52) U.S. Cl. ........................................ 74/423
(58) Field of Classification Search ............. 74/412 R, 74/423, 467, 606 R, 606 A
See application file for complete search history.

(56) References Cited

U.S. PATENT DOCUMENTS

| | | | |
|---|---|---|---|
| 2,106,535 A * | 1/1938 | Pattison et al. | 451/355 |
| 2,583,751 A * | 1/1952 | Schmitter | 184/104.1 |
| 3,572,154 A * | 3/1971 | Bartolomucci | 74/424 |
| 3,813,956 A | 6/1974 | Whitecar | |
| 4,510,395 A | 4/1985 | Sohrt | |
| 5,425,666 A * | 6/1995 | Frank et al. | 451/344 |
| 5,765,961 A | 6/1998 | Phillips | |
| 6,840,137 B2 | 1/2005 | Kaplan et al. | |
| 7,252,581 B2 * | 8/2007 | Numata et al. | 451/359 |
| 2005/0281687 A1 * | 12/2005 | Frauhammer et al. | 417/366 |
| 2006/0000301 A1 | 1/2006 | Kant | |

FOREIGN PATENT DOCUMENTS

| | | |
|---|---|---|
| BE | 527 697 | 3/1953 |
| DE | 858 920 | 9/1943 |
| DE | 1000654 | 1/1957 |
| DE | 1984407 | 4/1968 |
| DE | 2 138 134 | 2/1973 |
| EP | 0 079 455 | 5/1983 |
| GB | 1005059 | 9/1965 |
| GB | 1 522 909 | 8/1978 |

* cited by examiner

*Primary Examiner*—Vicky A Johnson
(74) *Attorney, Agent, or Firm*—Henry M. Feiereisen; Ursula B. Day

(57) ABSTRACT

A bevel gear mechanism, especially a bevel spur-gear mechanism having one or more gear mechanism stages, including a gear mechanism housing that surrounds the gear mechanism stages, and a motor cage, which is connected via a spacer flange to the gear mechanism housing, and is connected to an electric motor. The drive side shaft of the bevel gear mechanism stage is supported in a flanged bushing. Spacer flange and drive side end wall of the gear mechanism housing have a common bore. The common bore extends around the flanged bushing of the drive side shaft. The flanged bushing has a cylindrical outer surface that centers the gear mechanism housing, the spacer flange and the flanged bushing. Furthermore, the flanged bushing, the spacer flange and the drive side end wall are interconnected by screws.

11 Claims, 2 Drawing Sheets

BEVEL GEAR MECHANISM, ESPECIALLY BEVEL SPUR-GEAR MECHANISM

The instant application should be granted the priority date of 20 Feb. 2007, the filing date of the corresponding German patent application DE 10 2007 008 658.1

BACKGROUND OF THE INVENTION

The present invention relates to a bevel gear mechanism, especially a bevel spur-gear mechanism having one or more gear mechanism stages.

Known bevel gear mechanisms form a compact drive unit in a drive train together with the output side work machine, the drive side motor on the bevel pinion shaft, the couplings and further auxiliary units. In particular, couplings, service brakes or fans individually or in common are frequently installed in the shaft train between the motor and the input shaft of the gear mechanism with the bevel gear stage. For such components, to protect against rotating parts, various housings are known between motor and bevel gear mechanism, and can be configured in the shape of simple covers or housing cages that can be mechanically stressed.

The known bevel gear mechanisms for such a drive train are, pursuant to the mechanical assembly technique, available in different sizes having the same geometrical features. Such a drive train is frequently mounted on a machine mount base, the gear mechanism beam. With special mounting variations, the drive motor is supported on the gear mechanism housing by means of the motor cage. The shaft of the work machine carries the weight of the drive unit. A torque support prevents the rotation of the drive train. Such gear mechanisms exist for all conceivable installation positions, and with different structural forms of the drive and output shafts. Characteristic is the use of a largely unaltered main housing not only for the spur-gear mechanism but also for the bevel spur-gear mechanism.

DE 1 000 654 A discloses the mounting of a bevel pinion shaft of a bevel gear mechanism in a bearing bushing that is introduced into a long, one-piece housing bore, and that has a flange at one end. The bearing bushing surrounds the pinion shaft, the interior of which is guided by roller bearings, and together with further components forms an assembly that can be easily pre-mounted. The housing bore extends axially over the length of the cylindrical outer peripheral surface of the bearing bushing. The long, deep bore easily aligns the assembly and has the required rigidity. The required contact pattern in the tooth engagement of the bevel gear stage can be established by shims between the flange of the bearing bushing and the gear mechanism housing, or via axially acting adjustment mechanisms. The drawback of such a construction is the very great axial installation space requirement not only for the bearing bushing but also for further components in the drive train between motor and gear mechanism.

DE 1 984 404 U describes the arrangement of a fan wheel on the hub of a coupling flange that is mounted on the drive shaft of the bevel gear mechanism. The conical housing neck, which is part of the gear mechanism housing, and that surrounds the bearing bushing having the bevel pinion shaft, is not altered by the additional arrangement of the fan wheel. The fan is adapted to the prescribed contour of the gear mechanism in such a way that the blades also surround parts of the housing. The fan hood that is adapted to the fan must guide the air stream along the conical housing neck of the bevel gear stage to the gear mechanism housing. The drawback of such a design is the axially wide stretches that the air stream must overcome to reach the surfaces of the gear mechanism housing. Another drawback is the complicated configuration of fan and fan hood. In addition, the fan hood is not suitable to realize the necessary protection against access in the region of the coupling.

US 2006/0000301 A1 discloses a gear mechanism housing for a bevel spur-gear mechanism that has a spacer flange formed on the gear mechanism housing and that is produced as a one-piece cast part. The spacer flange contains a plurality of openings through which an air stream produced by a fan wheel passes and is guided in channels to the gear mechanism housing. The integrally molded bearing flange is mounted at an end ahead of the housing neck of the bevel pinion shaft, and leads to a disadvantageously long axial space requirement for the drive unit. The end flange of the bearing bushing of the bevel pinion shaft is similarly supported in the bearing flange and, due to its radial dimensions, displaces the air passage openings in the integrally molded spacer flange very far to the outside, so that here due to the large radial minimal diameter drawbacks with regard to flow dynamics result for the beginning of the openings.

The known combination of individual components of the gear mechanism from a prefabricated parts assembly program to form a drive train always leads to a long overall drive construction. Furthermore, the defined interface locations between the individual components in particular hinder the function of the fan. The fans can be differentiated by two different operating principles. Axial fans convey an air stream in the axial direction over the entire fan cross-section. A drawback is the conveying direction of the air, which is a function of the direction of rotation. Radial fans draw the air in the region of the drive shaft and convey it radially outwardly along the blades of the fan. Here cooling baffles or hoods must deflect the air stream in a defined manner. The radial fans can particularly advantageously be designed so as to be independent of the direction of rotation. The drawback is the intake of air in the region of the shaft. The interface parts or locations of the adjoining structural elements in the drive train routinely obstruct the conveying effect of the radial fan via their inlet housings, such as, for example, the cover hood of a coupling. The optimization of individual components, such as, for example, of fans and fan hoods, in cooperation with a bevel gear mechanism, alone does not lead to any significant improvements.

The object of the present invention is to improve the bevel gear mechanism of the aforementioned general type that is constructed pursuant to the mechanical assembly technique in such a way that a drive unit that is composed of bevel gear mechanism and electric motor, and that has a compact, axially short construction and at the same time a high rigidity, can also be achieved for a large motor output. In addition, an application-dependent equipping with auxiliary units, such as couplings and brakes, should not lead to an obstruction of the air supply for the cooling of the drive unit.

SUMMARY OF THE INVENTION

The object is inventively realized with a bevel gear mechanism of the aforementioned general type comprising a gear mechanism housing that surrounds the gear mechanism stages and with a motor cage that by means of a spacer flange is connected to the gear mechanism housing and is connected to an electric motor, whereby the drive side shaft of the bevel gear mechanism stage is mounted in a flanged bushing, wherein the spacer flange and the drive side end wall of the gear mechanism housing have a common bore that extends around the flanged bushing of the drive side shaft, further wherein the flanged bushing has a cylindrical outer surface that centers the gear mechanism housing, the spacer flange and the flanged bushing, and wherein the flanged bushing, the spacer flange and the drive side end wall are interconnected by screws.

BRIEF DESCRIPTION OF THE DRAWINGS

This invention and the advantages of the invention, will be explained in detail subsequently in conjunction with an embodiment illustrated in the drawings, in which.

DESCRIPTION OF SPECIFIC EMBODIMENTS

Figure 1:
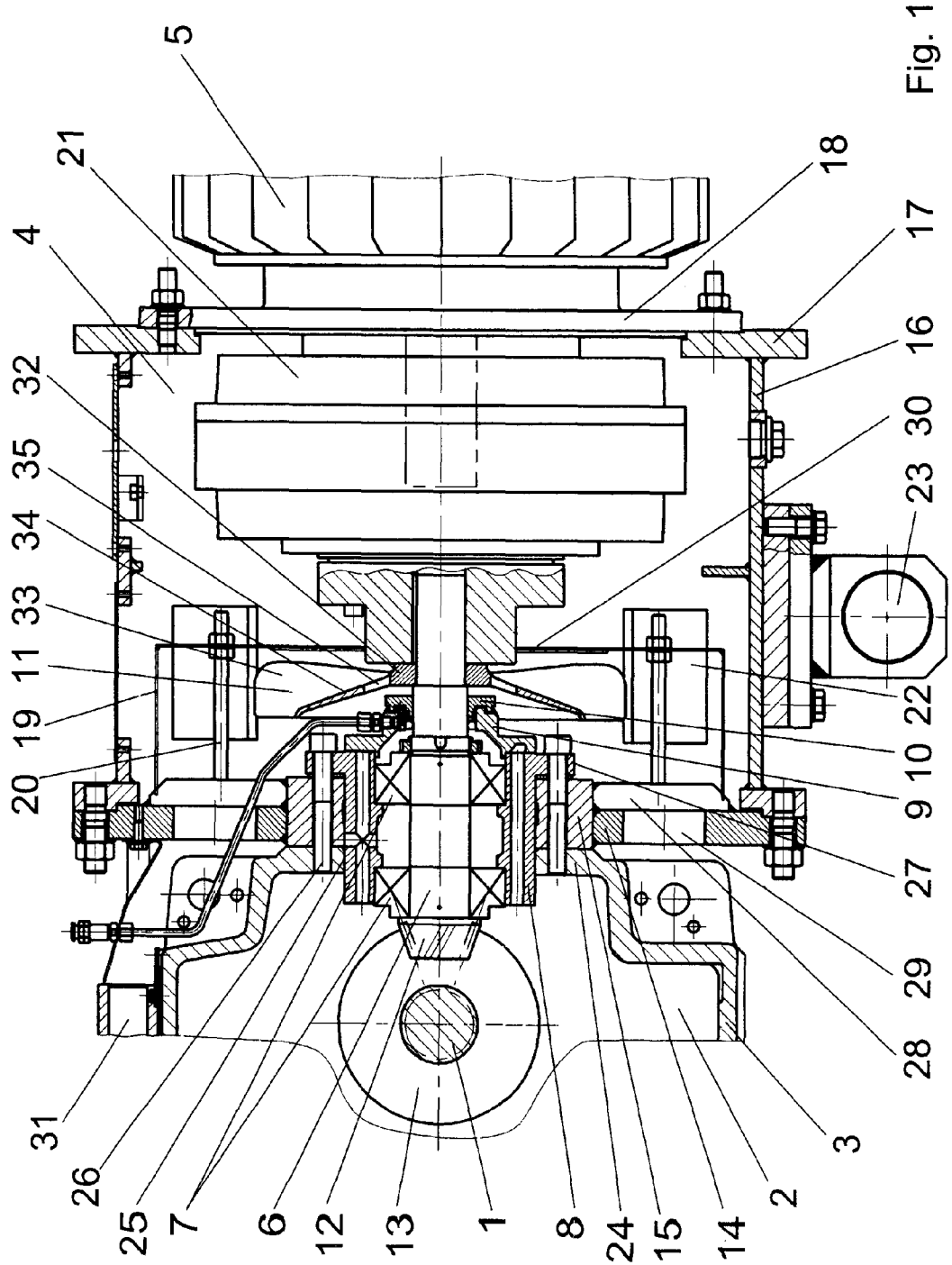
FIG. 1 is a longitudinal cross-sectional side view of a bevel gear mechanism having a motor cage pursuant to the invention.

Referring now to the drawings in detail, FIG. 1 shows an input side bevel gear stage 1 of a single-stage bevel gear mechanism 2 or of a multi-stage bevel spur-gear mechanism in a cutaway gear mechanism housing 3. A motor cage 4 represents the transition from the gear mechanism housing 3 to an electric motor 5. The output shaft of the electric motor 5 is connected via a coupling 21 with the input side bevel pinion shaft 6 of a drive unit.

The bevel gear stage 1 of the bevel gear mechanism is comprised of a bevel pinion shaft 6, of roller bearings 7 for the support of the bevel pinion shaft 6, a flange bushing 8 that accommodates the roller bearing 7, a bearing cover 9, and a seal 10 as a termination of the bearing that is embodied as a taconite seal. A bevel pinion 12, which is mounted in an overhanging manner on the bevel pinion shaft 6, drives a bevel gear 13 on a not further illustrated intermediate shaft in the bevel gear mechanism 2.

The motor cage 4 has a cylindrical outer wall 16 which is connected on the gear mechanism side to a spacer flange 14 and on the opposite side to a further flange 17. The center of the spacer flange 14 is provided with a bearing plate 15 via which the spacer flange 14 is connected to the gear mechanism housing 3 in a manner to be described subsequently.

The further flange 17 is connected to the motor flange 18 at the motor housing of the electric motor 5 and represents the transition of the motor cage 4 to the electric motor 5. The connection dimensions of the electric motor 5 and the bore pattern in the motor flange 18 are set by internationally applicable standards. Disposed in the interior of the motor cage 4, on the bevel pinion shaft 6, is a fan 11 that is advantageously embodied as a radial fan. A very straightforward, cylindrical air-conducting hood 19 surrounds the fan 11. The hood 19 is mounted on the spacer flange 14 via a connection that includes threaded rods 20. Disposed in the outer wall 16 of the motor cage 4 are openings 22 that serve not only for the supply of air but are also used for maintenance work. Disposed in the lower region of the motor cage 4 is a receiving means 23 for a torque support.

The drive side end wall 24 of the gear mechanism housing 3 is provided in the region of the bearing plate 15 of the spacer flange 14 with a bearing neck or journal for accommodating a bevel pinion shaft; the journal is very thin in comparison to known integrally molded bearing necks or journals. Adjoining the thin wall portion of the end wall 24 of the gear mechanism housing 3 is the bearing plate 15, which is very thick in comparison to the spacer flange 14 of the motor cage 4. A common bore 25 for receiving the flanged bushing 8 extends through the end wall 24 and the bearing plate 15. In contrast to known integrally molded bearing necks or bearing cups, the advantageous combination of housing end wall 24 and bearing plate 15 leads to a considerable axial shortening of the overall length of the drive train. The configuration of the support for the flanged bushing 8 out of a pairing of a thin housing end wall 27 and the thick bearing plate 15 to form an overall unit that surrounds the flanged bushing 8 additionally provides an adequately high rigidity for the guidance of the bevel pinion shaft 6.

The cylindrical outer surface of the flanged bushing 8 is provided with sufficiently narrow tolerances for dimension, shape and position to center the combination of flanged bushing 8, gear mechanism housing 3, and the bearing plate 15. The flanged bushing 8 is provided at the end with a flange 27 through which a plurality of screws 26 are guided. The screws 26 interconnect the components of the housing—the flanged bushing 8, the bearing plate 15, the end wall 24—that are necessary for the support of a bevel pinion shaft 6, as a result of which a very short gear mechanism housing 3 is formed that has a modular construction. The required contact pattern in the tooth engagement of the bevel gear stage 1 can be established in a very simple manner via shims between the flange 27 of the flanged bushing 8 and the bearing plate 15. The centering of the housing components can also be effected via equivalent means, such as adjusting pins or steps in the joint surfaces.

To reduce weight, the spacer flange 14 of the motor cage 4 is thinner than is the bearing plate 15. The spacer flange 14 and the bearing plate 15 are welded together and are reinforced with ribs 28. The structural component formed of the spacer flange 14, the bearing plate 15, and the ribs 28 can, with an equivalent functionality, also be produced as a cast part. Pursuant to a further modification, the flanged bushing 8 can also be cast onto the cast part.

Four air openings 29 are disposed in the spacer flange 14 on a pitch circle, the diameter of which is less than the diameter of the air-conducting hood 19; the cooling air stream passes through the air openings 29 from the fan 11 onto the gear mechanism housing 3. The ribs 28 of the spacer flange 14 and of the bearing plate 15, which are disposed in the region of the air openings 29, aid the guidance of the air stream, as does the air-conducting hood 19. In contrast to known fan shells, the air-conducting hood 19 merely has the task of deflecting the radially directed air stream of the fan 11 into the axial direction. The outer wall 16 of the motor cage 4 provides the necessary protection against access to the rotating parts of the fan 11. In the region of the air inlet at a fan hub 32, a simple circular opening 30 in the air-conducting hood 19 enables the unobstructed air supply from the interior of the motor cage 4 or from the atmosphere through the openings 22 and the outer wall 16 of the motor cage 4. The diameter of the opening 30 is a function only of the intake cross-section of the fan 11. In contrast to known covers and air-conducting hoods, the opening 30 need not be secured with screen elements to protect against access. Since also the adjacent coupling 21 is disposed in the motor cage 4, and therefore no further protection against access is required, the air entry into the fan 11 is not obstructed as is the case with known inlet housings having distinct interface parts. With the advantageous configuration of the construction for the intake conditions in the motor cage 4, even the resulting heat of the coupling 21 can be withdrawn out of the drive train by the fan 11 of the bevel gear mechanism 2. The effectiveness of the cooling capacity for the gear mechanism is of course not adversely affected with an efficiently dimensioned conveying capacity of the fan 11. It is expedient to conduct the cooling air stream, after it leaves the motor cage 4, through the openings 29 via further fins or guides 31 in a defined manner along the gear mechanism housing 3.

Since a lot of heat results in the region of the rapidly running bevel pinion shaft 6 and the roller bearings 7, a reliable and rapid withdrawal of heat can be achieved by heat conduction through the bearing plate 15 to the spacer flange 14 and the ribs 28. The outer surfaces of the bearing plate 15, the ribs 28 and the spacer flange 14 have the cooling air stream of the fan 11 blown against them in a particularly satisfactory manner. Due to the material accumulation in the thick bearing plate 15, the heat can be absorbed very rapidly and can be conducted away in an unobstructed manner. The compact construction that is achieved is a further advantage with regard to the withdrawal of heat in comparison to known motor cages, which are screw-fastened to the gear mechanism housing at other locations. Similarly, the inventive configuration of the housing components significantly increases the fluidic effectiveness of the known fan 11 that is used and that is embodied as a radial fan.

A further advantage resulting from the compact, modular construction of the support of the bevel pinion shaft 6 is the possibility of being able to use bevel pinion shafts from a standard component program of a gear mechanism assembled of prefabricated parts without structural alterations, since there is no axial extension of the drive. The elimination of the clearly defined interface parts or locations between the individual components bevel gear mechanism and motor cage also serves the purpose since the bearing plate 15 fulfills not only functions of the gear mechanism housing 3 but also of the motor cage 4.

Of decisive significance for the function of the advantageously configured housing components for the support of the bevel pinion shaft 6 is the possibility of being able for many years to use reliably proven standard components, such as the radial fans, without change. With drive units in the higher capacity range, means for improving the heat withdrawal are always to be used. A fan is a particularly suitable component for this purpose.

The fan 11 is secured on the bevel pinion shaft 6 directly adjacent to the cover of the seal 10 in a positive or positively-engaging manner. Radially adjoining the fan hub 32 are the outwardly directed vanes or blades 33 of the fan 11. By means of an annular surface 34 between the blades 33 that extends outwardly at an incline, the air stream that is drawn in by the fan 11 at the level of the hub is deflected from the intake entry at the level of the shaft to the ends of the radial blades 33. Disposed in the annular surface 34 are apertures 35 that lead to air from the intake region flowing about both sides of the annular surface 34. The configuration of the annular surface 34 with the apertures 35 prevents the formation of an underpressure in the region of the seal 10, which could lead to leakage of gear oil. The combination of the matured construction of the fan 11 proven over many years with the advantageously configured housing components, makes it possible by their interaction to have the desired axially shortened construction of the drive unit.

Figure 2:
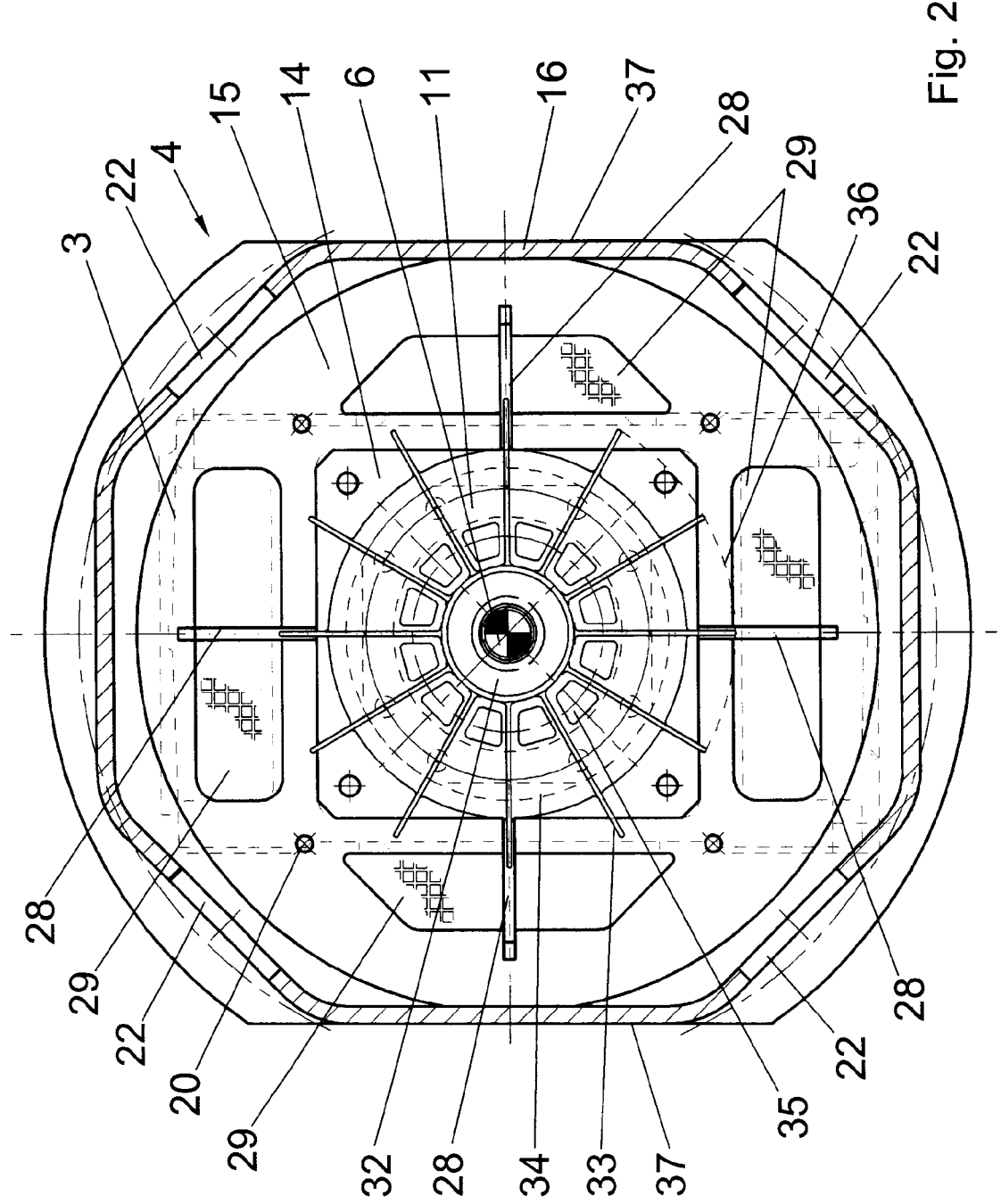
FIG. 2 is a view taken in the axial direction onto the spacer flange on the bevel gear mechanism of FIG. 1.

FIG. 2 illustrates a view in the axial direction onto the spacer flange 14. The coupling 21, which together with the fan 11 sits on the bevel pinion shaft 6, is not indicated. Four air openings 29 are contained in the spacer flange 14; the cooling air stream flows through the air openings to the side surfaces of the gear mechanism housing 3, which is disposed behind the spacer flange 14. The blades of the fan 11 generate the air stream and pass over a circular surface 36 that overlaps the bearing plate and parts of the spacer flange 14. The bearing plate 15 and the ribs 28 are in particular disposed directly in the air stream produced by the fan 11 and can, by means of the short direct contact to the flanged bushing 8, withdraw the heat of the roller bearings 7 particularly well at all four openings 29 that are illustrated here. In addition, the ribs 28 deflect the air stream into the channels to the gear mechanism.

The rotationally symmetrical components that are disposed in the motor cage 4, such as the fan 11 and the coupling 21, require a cylindrical configuration of the outer wall 16 of the connection element motor cage 4. However, since the width of the overall drive unit is limited, installation space can be saved by means of the flattened portions 37 on both sides of the spacer flange 14 and of the outer wall 16 of the motor cage 4. Thus, due to the advantageous profiling, the parallelepipedal configuration of the gear mechanism housing 3 continues to the electric motor 5. The illustrated outer walls 16 can advantageously be adapted to the prescribed contour via a prismatic intermediate piece.

The specification incorporates by reference the disclosure of German priority document DE 10 2007 008 658.1 filed 20 Feb. 2007.

The present invention is, of course, in no way restricted to the specific disclosure of the specification and drawings, but also encompasses any modifications within the scope of the appended claims.

What I claim is:

1. A bevel gear mechanism having one or more gear mechanism stages, comprising:
   a gear mechanism housing that surrounds the gear mechanism stages;
   a motor cage, wherein said motor cage is adapted to be connected to an electric motor;
   a spacer flange, wherein said motor cage is connected to said gear mechanism housing via said spacer flange;
   a flanged bushing, wherein a drive side shaft of a bevel gear mechanism stage is supported in said flanged bushing, further wherein said spacer flange and a drive side end wall of said gear mechanism housing are provided with a common bore that extends around said flanged bushing, and wherein said flanged bushing has a cylindrical outer surface that is adapted to center said gear mechanism housing, said spacer flange and said flanged bushing; and
   screws that interconnect said flanged bushing, said spacer flange and said drive side end wall of said gear mechanism housing,
   wherein said spacer flange is provided with a central bearing plate that extends around said flanged bushing, and wherein a thickness of said bearing plate is greater than a thickness of said drive side end wall of said gear mechanism housing and is greater than a thickness of said spacer flange beyond said bearing plate.

2. A bevel gear mechanism according to claim 1, wherein an end of said flanged bushing is provided with a flange that rests against said spacer flange on a side remote from said gear mechanism housing.

3. A bevel gear mechanism according to claim 1, wherein said spacer flange and said bearing plate are reinforced by ribs.

4. A bevel gear mechanism according to claim 1, wherein an outer wall of said motor cage, and said spacer flange, are provided laterally with flattened portions.

5. A bevel gear mechanism having one or more gear mechanism stages, comprising:
   a gear mechanism housing that surrounds the gear mechanism stages;
   a motor cage, wherein said motor cage is adapted to be connected to an electric motor;

a spacer flange, wherein said motor cage is connected to said gear mechanism housing via said spacer flange;

a flanged bushing, wherein a drive side shaft of a bevel gear mechanism stage is supported in said flanged bushing, further wherein said spacer flange and a drive side end wall of said gear mechanism housing are provided with a common bore that extends around said flanged bushing, and wherein said flanged bushing has a cylindrical outer surface that is adapted to center said gear mechanism housing, said spacer flange and said flanged bushing;

screws that interconnect said flanged bushing, said spacer flange and said drive side end wall of said gear mechanism housing; and a fan disposed within said motor cage on said drive side shaft of said gear mechanism, wherein openings are provided in an outer wall of said motor cage for a drawing-in of air, and wherein air openings are provided in said spacer flange for a discharge of the air.

6. A bevel gear mechanism according to claim 5, wherein said fan is a radial fan.

7. A bevel gear mechanism according to claim 5, which further comprises an air-conducting hood having an axial opening, wherein said air-conducting hood extends around said fan and is secured to said spacer flange.

8. A bevel gear mechanism according to claim 5, wherein on one side of said spacer flange ribs of said spacer flange and of a bearing plate of said spacer flange are disposed in a region of said air openings in said spacer flange, and on the other side of said spacer flange fins are disposed on said gear mechanism housing, further wherein said ribs and said fins are aligned with one another, and wherein said ribs and said fins form a flow path for the air that is drawn in by said fan from said motor cage.

9. A bevel gear mechanism according to claim 5, wherein said fan is provided with an annular surface that extends outwardly at an angle and that extends beyond said flanged bushing, and wherein apertures are disposed in said annular surface.

10. A bevel gear mechanism according to claim 5, wherein an end of said flanged bushing is provided with a flange that rests against said spacer flange on a side remote from said gear mechanism housing.

11. A bevel gear mechanism according to claim 5, wherein an outer wall of said motor cage, and said spacer flange, are provided laterally with flattened portions.

\* \* \* \* \*